US009071571B2

(12) United States Patent
Bhide et al.

(10) Patent No.: US 9,071,571 B2
(45) Date of Patent: Jun. 30, 2015

(54) INTERACTION VIA SHORT MESSAGE SERVICE MESSAGES WITH WIRELESS MARKUP LANGUAGE BASED WEBSITES (75) Inventors: Manish A. Bhide, New Delhi (IN); Ajay K. Gupta, New Delhi (IN); Mukesh K. Mohania, Agra (IN); Sumit Negi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 13/173,842

(22) Filed: Jun. 30, 2011

(65) Prior Publication Data
US 2013/0007589 A1    Jan. 3, 2013

(51) Int. Cl.
*G06F 17/00* (2006.01)
*H04L 29/08* (2006.01)
*H04W 4/14* (2009.01)
*H04L 12/58* (2006.01)

(52) U.S. Cl.
CPC ............. *H04L 67/02* (2013.01); *H04W 4/14* (2013.01); *H04L 51/38* (2013.01)

(58) Field of Classification Search
CPC .......... H04W 4/14; H04L 51/38; H04L 67/02
See application file for complete search history.

(56) References Cited

U.S. PATENT DOCUMENTS

| | | | |
|---|---|---|---|
| 6,961,330 B1 | 11/2005 | Cattan et al. | |
| 7,020,685 B1 | 3/2006 | Chen et al. | |
| 7,318,098 B2 | 1/2008 | Steinberg et al. | |
| 7,379,920 B2 | 5/2008 | Leung et al. | |
| 2002/0083035 A1* | 6/2002 | Pearl et al. | 707/1 |
| 2004/0006538 A1* | 1/2004 | Steinberg et al. | 705/39 |
| 2004/0205650 A1* | 10/2004 | Cheng | 715/530 |
| 2007/0130499 A1* | 6/2007 | Kim | 715/500.1 |
| 2007/0233813 A1* | 10/2007 | Peng et al. | 709/219 |
| 2010/0191648 A1 | 7/2010 | Smith | |

OTHER PUBLICATIONS

Frost, Martin; "Learning WML & WMLScript"; 2000; O'Reilly; pp. 27-42.*

* cited by examiner

*Primary Examiner* — Scott Baderman
*Assistant Examiner* — Asher Kells
(74) *Attorney, Agent, or Firm* — Rabindranath Dutta; Konrad, Raynes, Davda and Victor LLP (57) ABSTRACT A computational device receives a first text message in a text messaging format from a mobile device to access a website that stores information in a markup language format. The computational device converts one or more elements of the stored information from the markup language format to the text messaging format. The computational device sends a second text message that indicates how to interact with the website in the text messaging format to the mobile device.

18 Claims, 9 Drawing Sheets

INTERACTION VIA SHORT MESSAGE SERVICE MESSAGES WITH WIRELESS MARKUP LANGUAGE BASED WEBSITES

BACKGROUND

1. Field

The disclosure relates to a method, system, and computer program product for interaction via short message service messages with wireless markup language based websites.

2. Background

Wireless Markup Language (WML) is a markup language based on extensible markup language (XML). WML is directed towards devices that implement the Wireless Application Protocol (WAP) specification. WML may provide navigational support, data input, hyperlinks, text and image presentation, and forms. A WML document is referred to as a deck. Data in the deck is structured into one or more "cards" (pages), where each card represents a single interaction with the user. A WAP browser may be implemented in a mobile client to interact with WML documents stored in a WML server. The WAP browser may allow a user to select WML links to navigate to different cards of the WML document. A collection of related WML documents may form a website that is hosted in the WML server.

Short Message Service (SMS) is a text communication service component of phone, web, or mobile communication systems. SMS may use standardized communications protocols that allow the exchange of short text messages between mobile devices. The size of SMS messages is limited by the constraints of the SMS protocol to precisely 140 octets (140 octets are equivalent to 140×8 bits, i.e., 1120 bits). SMS messages can be encoded using a variety of alphabets. In certain SMS based systems this may lead to maximum individual short message sizes of 160 7-bit characters, 140 8-bit characters, or 70 16-bit characters.

SUMMARY OF THE INVENTION

Provided are a method, a system, and a computer program product in which a computational device receives a first text message in a text messaging format from a mobile device to access a website that stores information in a markup language format, converts one or more elements of the stored information from the markup language format to the text messaging format, and sends a second text message that indicates how to interact with the website in the text messaging format to the mobile device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain mobile phones and certain devices may not have a browser to interact with WML decks. However, such mobile phones and devices may have access to SMS. Certain embodiments allow information stored in WML decks to be accessed via SMS messages by such mobile phones and devices.

Certain embodiments enable SMS based access to WML websites. WML websites are parsed and inputs and other selections that are intended for browsers are reformatted, such that such inputs and selections may be accessed via SMS messages from a mobile device.

Exemplary Embodiments

Figure 1:
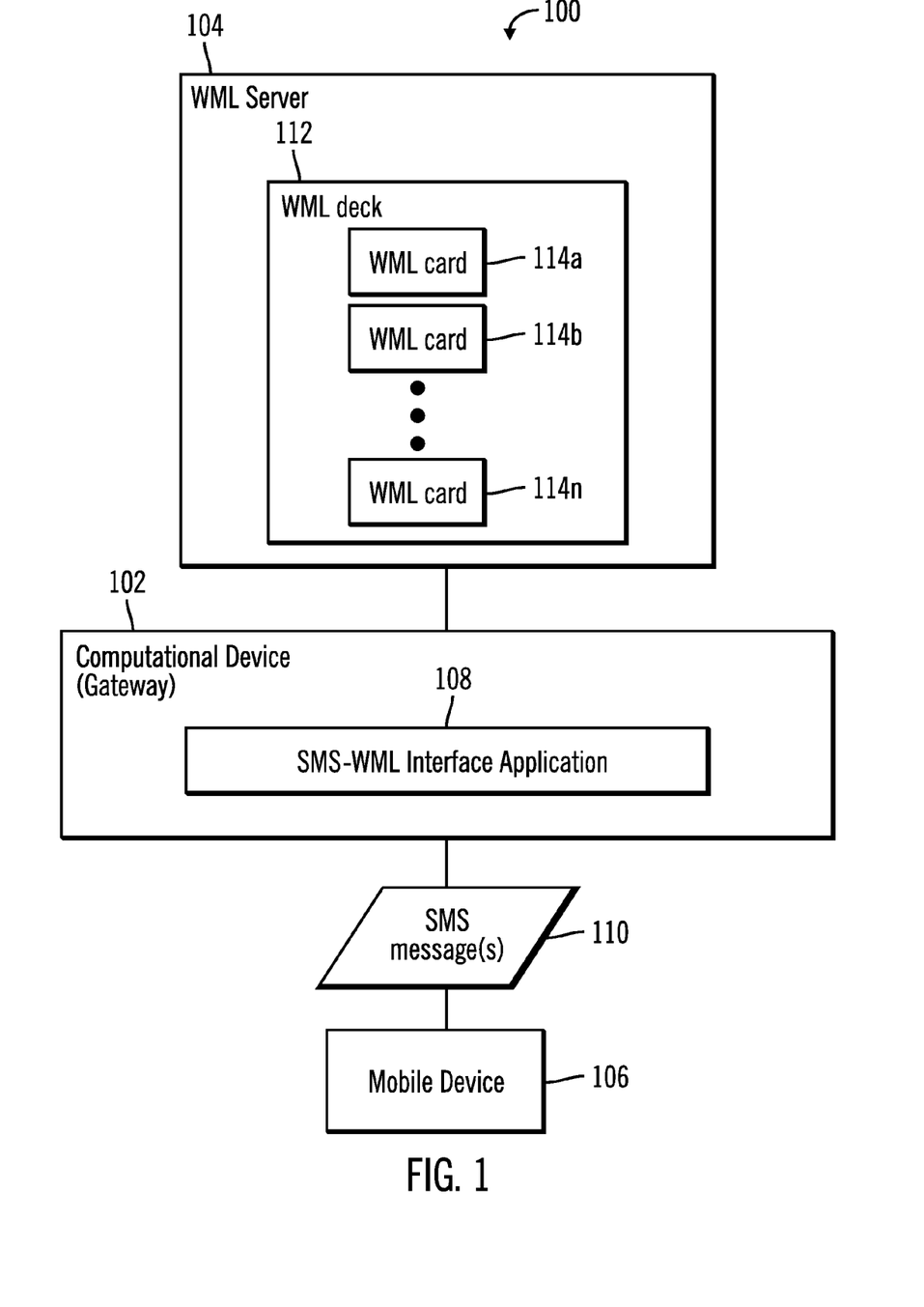
FIG. 1 illustrates a block diagram of a computing environment that includes a computational device coupled to a WML server and a mobile device, in accordance with certain embodiments.

FIG. 1 illustrates a block diagram of a computing environment 100 that includes a computational device 102 coupled to a WML server 104 and a mobile device 106, in accordance with certain embodiments;

The computational device 102, the WML server 104, and the mobile device 106 may comprise any suitable instruction execution device including those presently known in the art, such as, a personal computer, a workstation, a server, a mainframe, a hand held computer, a palm top computer, a telephony device, a network appliance, a blade computer, a server, etc. The computational device 102 may be coupled to the WML server 104 and the mobile device 106 by one or more networks, such as, the Internet, a wireless communication network, an Intranet, a Local Area network, a Wide Area Network, etc.

A SMS-WML interface application 108 is implemented in software, firmware, hardware or any combination thereof in the computational device 102. The SMS-WML interface application 108 may allow interactions of the mobile device 106 via SMS messages 110 with one or more WML decks 112 that comprise a website in the WML server 104. In certain embodiments, an exemplary WML deck 112 may be comprised of a plurality of WML cards 114*a*, 114*b*, . . . , 114*n*.

It may be noted that the WML deck 112 is designed for interaction with a WML browser that supports the WML specification. However, in certain embodiments, the mobile device 106 may not have a WML browser or may not be able to execute a WML browser. For example, the storage capacity, the processing power, or the available bandwidth may preclude the mobile device 106 from using a WML browser. Certain embodiments allow the mobile device 106 to use SMS messages to the computational device 102 to access information provided by the WML deck 112. The computational device 102 may be referred to as a gateway to the WML server 104.

Figure 2:
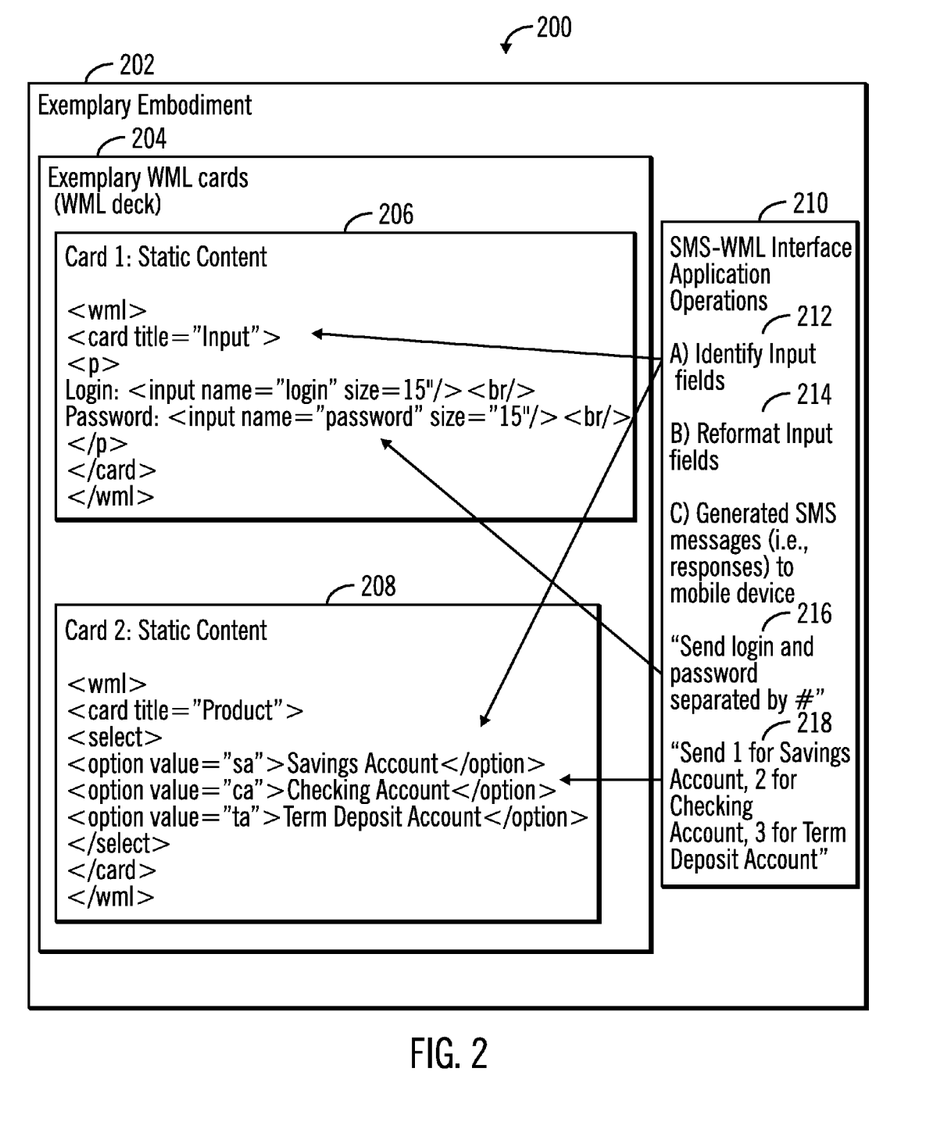
FIG. 2 illustrates a block diagram that shows how a SMS-WML interface application performs operations to parse exemplary WML cards, in accordance with certain embodiments.

FIG. 2 illustrates a block diagram 200 that shows how an SMS-WML interface application 108 performs operations to parse exemplary WML cards, in accordance with certain embodiments 202.

Certain exemplary WML cards 204 are shown in FIG. 2. The two cards that are shown are Card 1 (reference numeral 206) and Card 2 (reference numeral 208). Card 1 (reference numeral 206) is intended for input of login and password information by a WML based browser, and Card 2 (reference numeral 208) is intended for providing various options to a user who uses a WML browser to choose between a savings account, a checking account, and a term deposit account. However, no WML based browser is used by the mobile device 106.

In certain embodiments, the SMS-WML interface application 108 that executes in the computational device 102 performs the operations shown via reference numeral 210 in FIG. 2. The SMS-WML interface application 108 identifies (reference numeral 212) input fields in the exemplary WML cards 204 and reformats (reference numeral 214) the input fields for generating SMS messages to the mobile device 106, wherein exemplary messages 216, 218 corresponding to the exemplary WML cards 204 are shown in FIG. 2.

Figure 3:
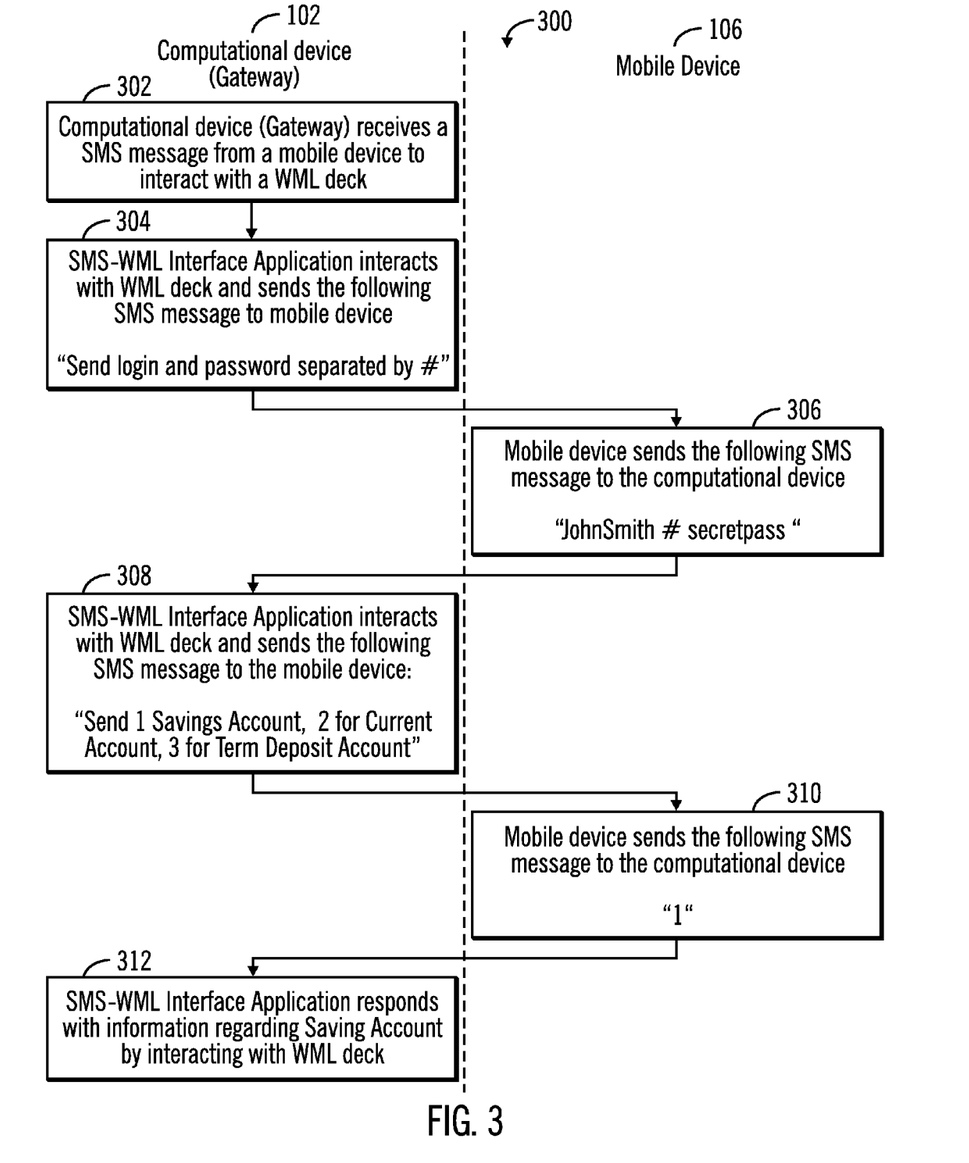
FIG. 3 illustrates a flowchart that shows exemplary interactions between a computational device and a mobile device, in accordance with certain embodiments.

FIG. 3 illustrates a flowchart 300 that shows exemplary interactions between a computational device 102 and a mobile device 106, in accordance with certain embodiments that implement the processing of the exemplary WML cards 204 shown in FIG. 2.

Control starts at block 302, in which the computational device 102, i.e., the gateway 102 receives a SMS message from a mobile device 106 to interact with a WML deck 204. The SMS-WML Interface Application 108 interacts with the WML deck 204 and sends (at block 304) the following SMS message to the mobile device 106: "Send login and password separated by #" by parsing and reformatting the content in card 1 (reference numeral 206).

Control proceeds to block 306, in which the mobile device 106 sends the SMS message "JohnSmith #secretpass" to the computational device 102 to provide the login name of 'JohnSmith' and the password of 'secretpass'. If this information is correct, then the SMS-WML Interface Application 108 interacts with WML deck 204 and sends (at block 308) the following SMS message to the mobile device 106: "Send 1 for Savings Account, 2 for Current Account, 3 for Term Deposit Account" by parsing and reformatting the content in card 2 (reference numeral 208).

Control proceeds to block 310, in which the mobile device 106 sends the SMS message "1" to the computational device 102 to indicate a selection of savings account. The SMS-WML Interface Application 108 may then respond (at block 312) with information regarding savings account by interacting with the WML server 104.

Therefore, FIG. 3 illustrates certain embodiments in which even though the mobile device 106 does not use a WML browser, the mobile device 106 is able to access information stored in the WML server 104 via SMS messages exchanged with a gateway 102 that parses and reformats WML cards stored in the WML sever 104.

Figure 4:
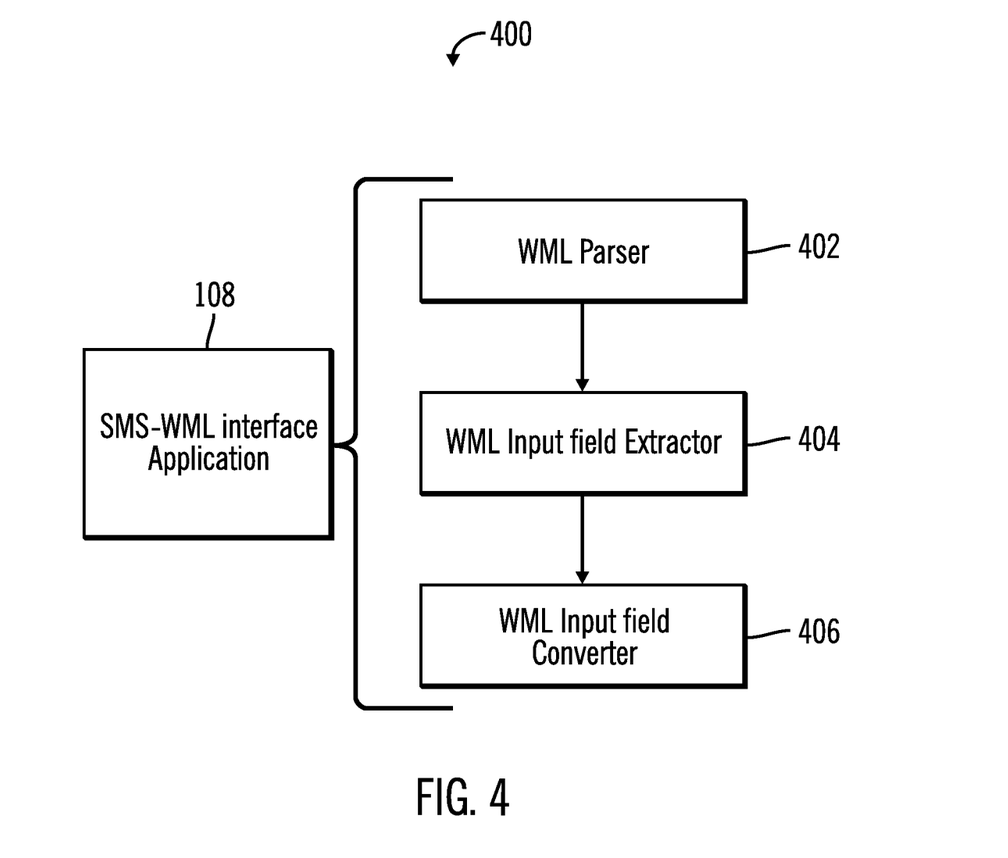
FIG. 4 illustrates a block diagram that shows certain components of an SMS-WML interface application, in accordance with certain embodiments.

FIG. 4 illustrates a block diagram that shows certain components of an SMS-WML interface application 108, in accordance with certain embodiments. The SMS-WML interface application 108 may have components corresponding to a WML parser 402, a WML input field extractor 404, and a WML input field converter 406. The WML parser 402 may parse tokens stored in the WML deck 112 to generate a data structure of tokens and their relationships. The WML input field extractor 404 may determine which tokens are inputs fields, and the WML input field converter 406 may convert the input fields in the WML format to input fields in the SMS format.

Figure 5:
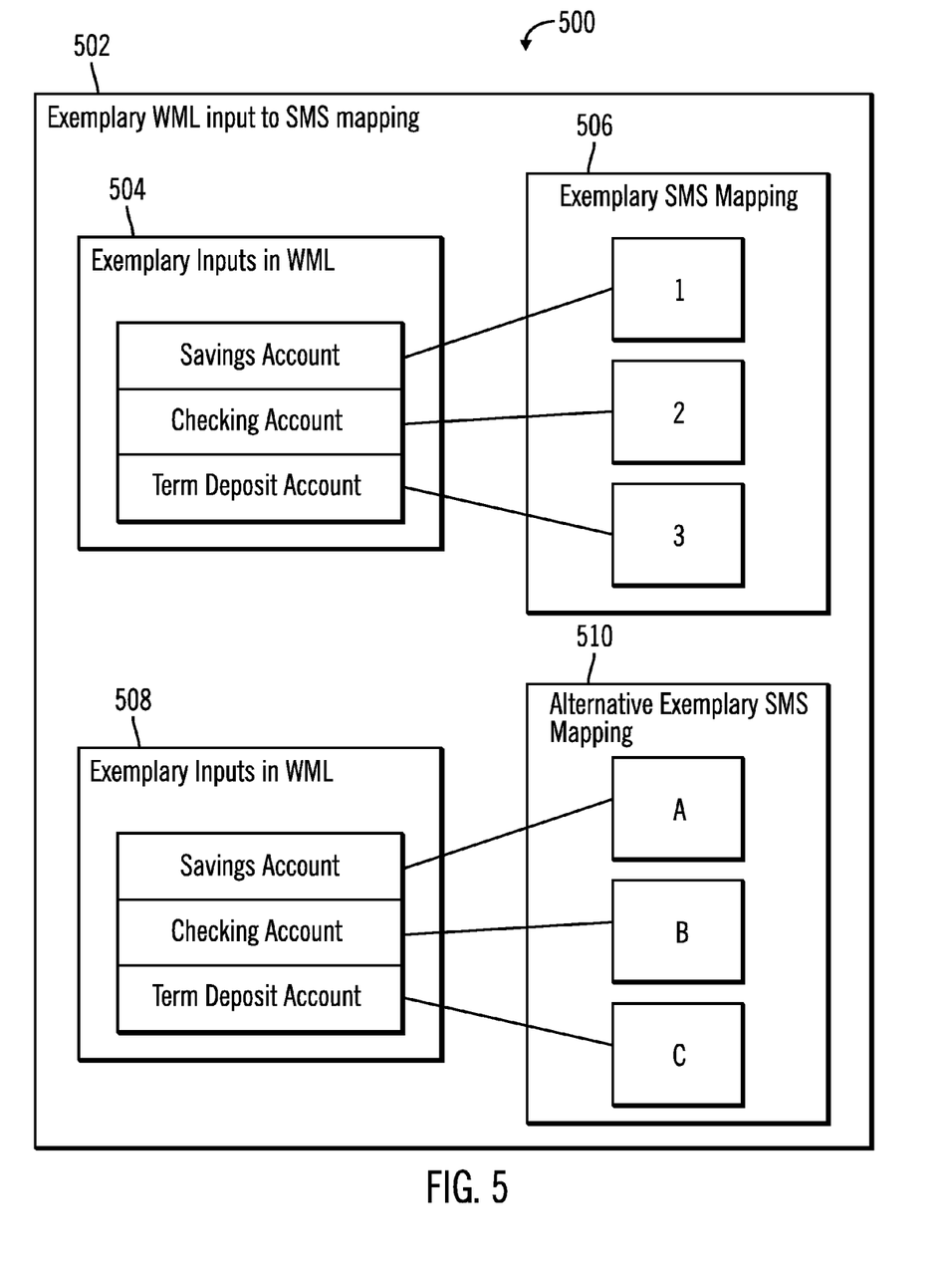
FIG. 5 illustrates a block diagram that an exemplary mapping of WML inputs to SMS format, in accordance with certain embodiments.

FIG. 5 illustrates a block diagram 500 that shows certain exemplary mappings 502 of WML inputs to SMS format, in accordance with certain embodiments.

In certain embodiments, exemplary inputs 504 in WML have been mapped into exemplary SMS mappings 506. In certain other embodiments, exemplary inputs 508 in WML have been mapped into exemplary SMS mappings 510. While exemplary inputs 504 and 508 are the same, the exemplary mappings into SMS may be different in different embodiments based on how the SMS-WML interface application 108 has been configured. For example in FIG. 5, in the exemplary SMS mapping 506 the WML inputs of saving account, checking account, and term deposit account are mapped to 1, 2, 3 in the SMS format, whereas in the exemplary SMS mapping 510 these WML inputs are mapped to A, B, C in the SMS format.

Figure 6:
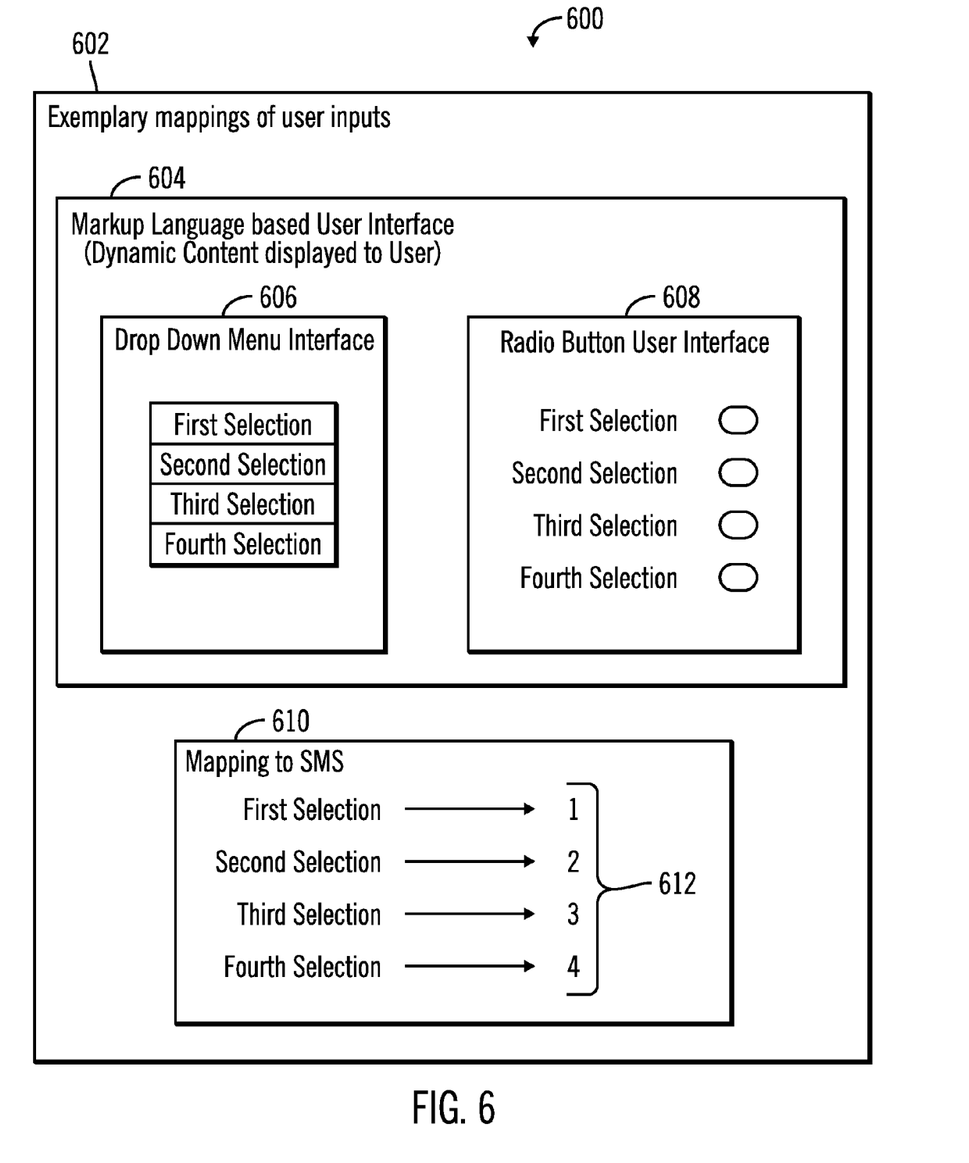
FIG. 6 illustrates a block diagram that shows certain exemplary mappings of user inputs provided by a user interface, in accordance with certain embodiments.

FIG. 6 illustrates a block diagram 600 that shows exemplary mappings 602 of user inputs provided by a user interface, in accordance with certain embodiments. In a markup language based user interface, such as a WML user interface, a drop down menu interface 606 and a radio button user interface 608 are shown. Such drop down menu interfaces 606 and radio button user interfaces 608 may be displayed by a markup language based browser that is not used by the mobile device 106.

In certain embodiments, the drop down menu interface 606 elements and the radio button user interface 608 elements may be mapped to the SMS format as shown via reference numeral 610. For example, the first, second, third, and fourth selection extracted from the markup language based user interfaces 604 may be mapped to 1, 2, 3, 4 respectively (shown via reference numeral 612).

Therefore, FIG. 6 illustrates certain embodiments, in which a SMS-WML interface application 108 maps markup language user interfaces to SMS format.

Figure 7:
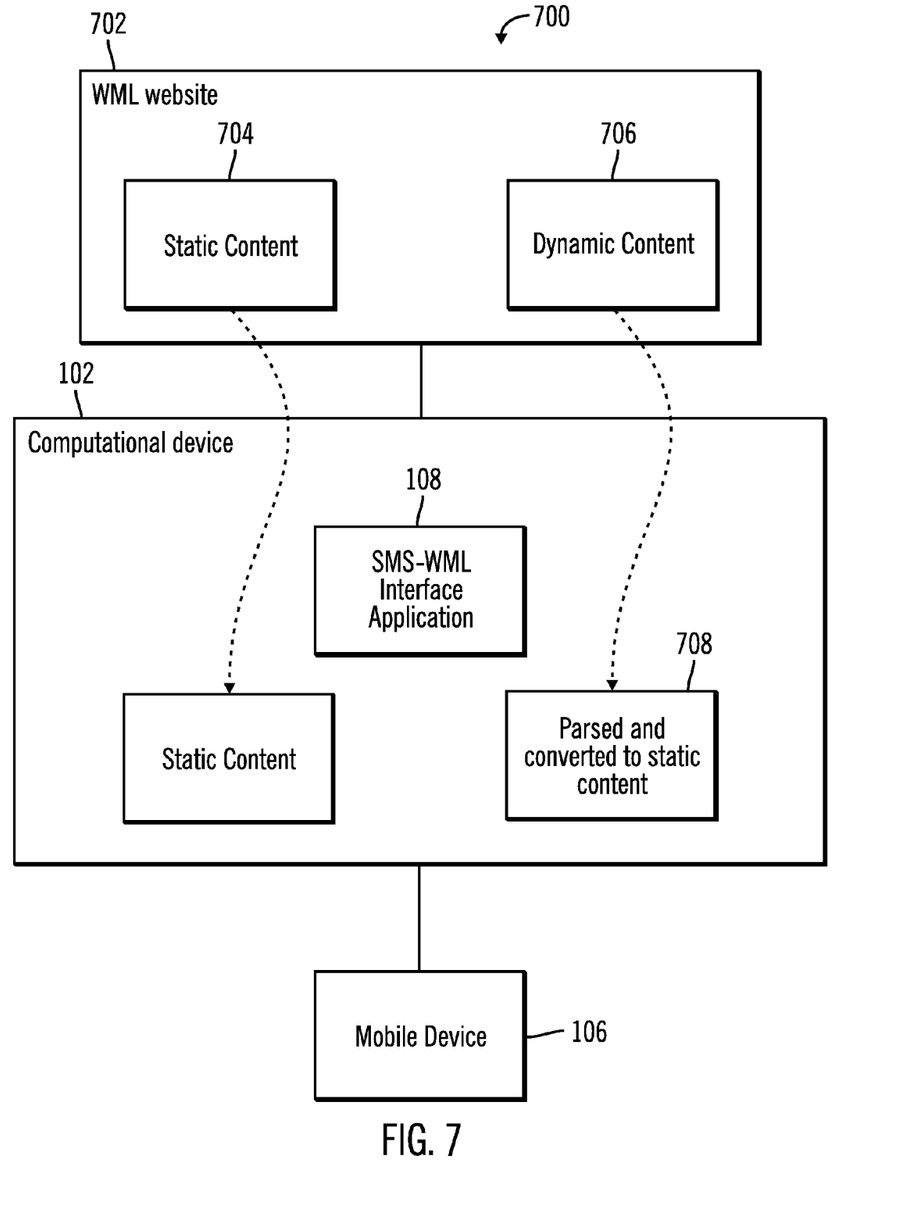
FIG. 7 illustrates a block diagram that shows operations on static and dynamic content, in accordance with certain embodiments.

FIG. 7 illustrates a block diagram 700 that shows operations on static and dynamic content, in accordance with certain embodiments. A WML website 702 maintained in the WML server 104 may provide both static content 704 and dynamic content 706. The static content 704 may not have to be changed for the mobile device 106. However, the SMS-WML interface application 108 parses the dynamic content 706 and converts the dynamic content to static content in a format that is usable via SMS messages from the mobile device 106 (shown via reference numeral 708). For example, the inputs, login and password information in WML are all examples of dynamic content that are converted to static content for the mobile device 106.

Figure 8:
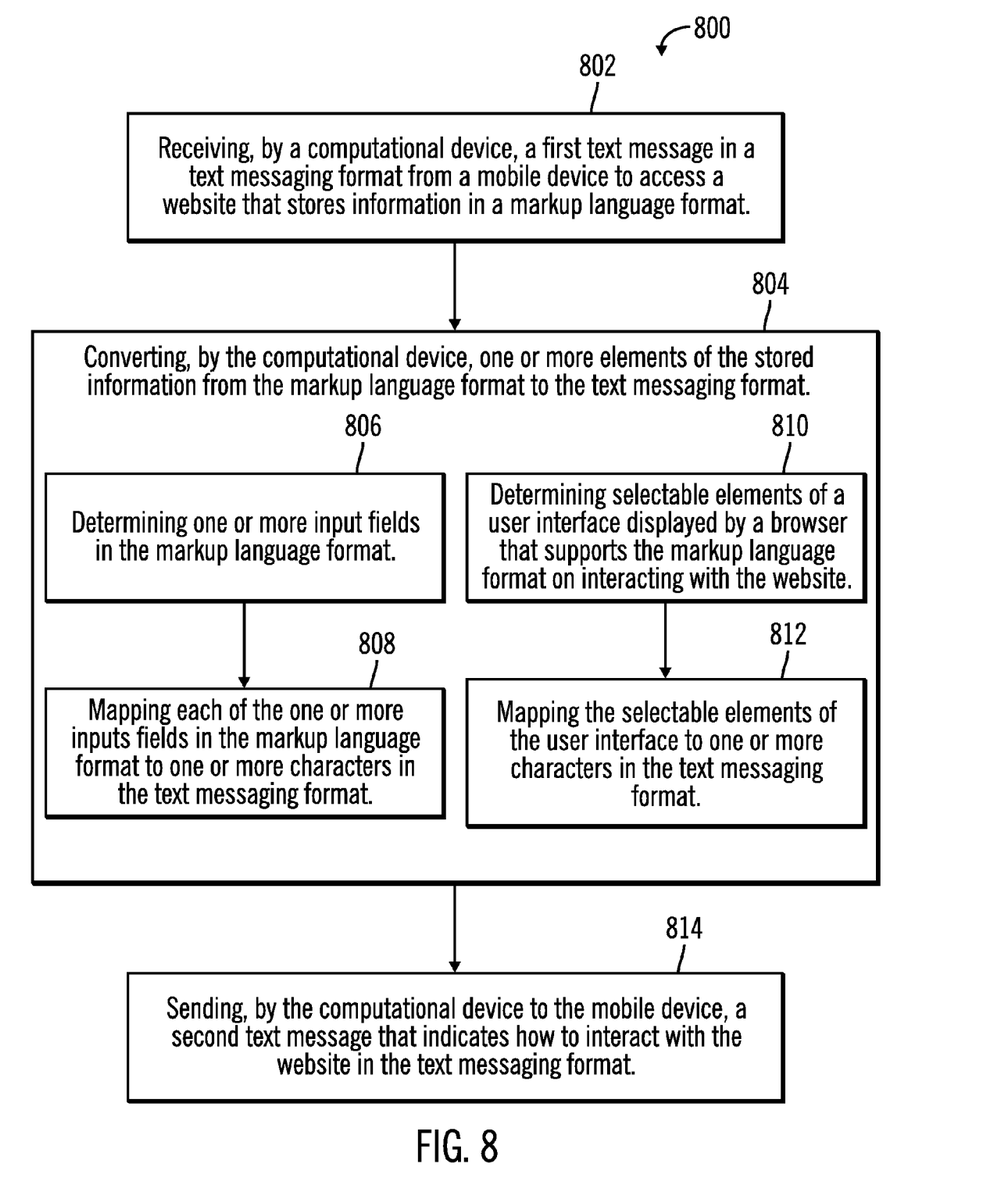
FIG. 8 illustrates a flowchart that shows operations performed by a computational device to allow a mobile client that uses SMS to interact with a website that uses WML, in accordance with certain embodiments.

FIG. 8 illustrates a flowchart 800 that shows operations performed by a computational device 102 to allow a mobile device 106 that uses SMS to interact with a website in a WML server 104 that uses WML, in accordance with certain embodiments. The operations shown in FIG. 8 may be performed by a SMS-WML interface application 108 implemented in the computational device 102 that may function as gateway to the WML server 104 for the mobile device 106.

Control starts at block 802, in which the computational device 102 receives a first text message in a text messaging format from a mobile device 106 to access a website that stores information in a markup language format. For example, in certain embodiments, the text messaging format is Short Message Service (SMS), and the markup language is Wireless Markup Language (WML), and the mobile device 106 may send a SMS message (a first text message) indicating the name of WML website with which the mobile device 106 intends to communicate and the computational device may receive the SMS message (the first text message).

The computational device 102 converts (at block 804) one or more elements of the stored information from the markup language format to the text messaging format.

In certain embodiments, the converting is performed by determining (at block 806) one or more input fields in the markup language format, and mapping (at block 808) each of the one or more inputs fields in the markup language format to one or more characters in the text messaging format. In additional embodiments, the converting may be performed by determining (at block 810) selectable elements of a user interface displayed by a browser that supports the markup language format on interacting with the website, and mapping (at block 812) the selectable elements of the user interface to one or more characters in the text messaging format, From block 804, control proceeds to block 814, in which the computational device 102 sends a second text message that indicates how to interact with the website in the text messaging format to the mobile device 106. For example, the computational device 102 may interpret a WML card and send a second text message to the mobile device 105 asking the mobile device to "Send login and password separated by #" as shown in block 304 of FIG. 3.

Subsequently, additional interactions may take place between the mobile device 106 and the gateway 102 to access the website maintained in the WML server 104.

Therefore, FIGS. 1-8 illustrate certain embodiments in which a mobile device 106 that does not have a WML browser, uses SMS messages via a gateway 102 to interact with a WML based website stored in a WML server 104. The gateway 102 parses and converts WML based websites into SMS formats for use by the mobile device 106.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
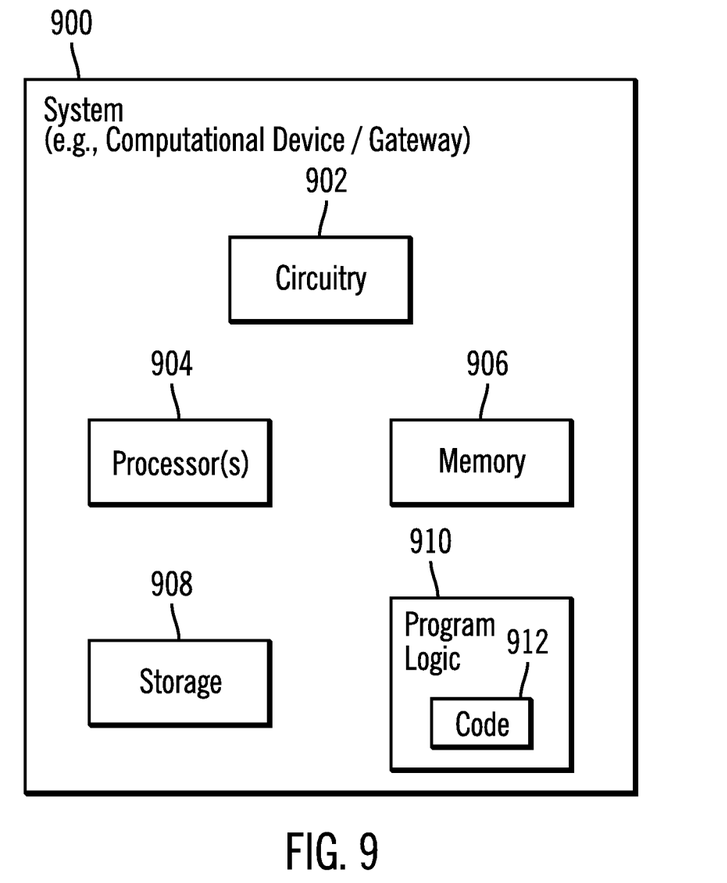
FIG. 9 illustrates a block diagram of a computational system that shows certain elements that may be included in computational device of FIG. 1, in accordance with certain embodiments.

FIG. 9 illustrates a block diagram that shows certain elements that may be included in the computational device 102, in accordance with certain embodiments. The system 900 may comprise the computational device 102 and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:

receiving, by an interface application executing in a computational device, a first text message in a text messaging format from a mobile device to access a website that stores information in a markup language format, wherein the information includes both static content and dynamic content, wherein the mobile device is not configurable to support a browser that is configurable to interact with the website in the markup language format, wherein the interface application comprises a parser, an input field extractor, and an input field converter for the information stored in the markup language format, wherein the parser parses tokens stored in a markup language deck to generate a data structure of the tokens and relationships among the tokens, wherein the input field extractor determines which of the tokens are inputs fields in the markup language format, and wherein the input field converter converts the input fields in the markup language format to input fields in the text messaging format;

sending, by the computational device, the static content of the stored information to the mobile device;

parsing and converting, by the computational device, one or more elements of the dynamic content of the stored information from the markup language format into corresponding static content that is usable via the text messaging format from the mobile device, wherein the dynamic content includes a drop down menu interface with a first plurality of selections and a radio button user interface with a second plurality of selections, and wherein the first and the second plurality of selections are parsed and converted into a plurality of numbers in the text messaging format; and sending, by the computational device to the mobile device, the corresponding static content in a second text message that indicates how to interact with the website in the text messaging format, wherein:

the text messaging format is Short Message Service (SMS); and the markup language is Wireless Markup Language (WML) format, wherein the information is stored via a WML deck comprising a plurality of WML cards, wherein a first WML card is for input of login and password information via the browser, and wherein a second WML card is for providing a plurality of selectable options to the browser.

2. The method of claim 1, wherein the one or more elements of the dynamic content includes selections in a drop down menu interface and the corresponding static content is a list of numbers in the text messaging format; and wherein the second text message requests the mobile device to use the list of numbers in the text messaging format to interact with the website.

3. The method of claim 2, wherein one or more elements of the dynamic content further includes fields corresponding to login and password information; and wherein the computational device indicates to the mobile device in the text messaging format, a mechanism to separate the login and password information in the text messaging format for sending to the computational device.

4. The method of claim 1, wherein at least a processing power, a storage capacity and a bandwidth of the mobile device precludes a browser from being used in the mobile device to access the information stored in the markup language format.

5. The method of claim 4, wherein a first card is in the markup language format is for input of login and password information by the browser, and a second card in the markup language format is for providing options for choosing selections to a user who uses the browser.

6. The method of claim 5, wherein the interface application identifies input fields in the first and the second card and reformats the input fields of the first and the second card into the text messaging format, and wherein the input fields of the second card are mapped to letters of the alphabet in the text messaging format.

7. A system configurable to communicate with a mobile device, the system comprising:

a memory; and a processor coupled to the memory, wherein the processor performs:

receiving, by an interface application, a first text message in a text messaging format from a mobile device to access a website that stores information in a markup language format, wherein the information includes both static content and dynamic content, wherein the mobile device is not configurable to support a browser that is configurable to interact with the website in the markup language format, wherein the interface application comprises a parser, an input field extractor, and an input field converter for the information stored in the markup language format, wherein the parser parses tokens stored in a markup language deck to generate a data structure of the tokens and relationships among the tokens, wherein the input field extractor determines which of the tokens are inputs fields in the markup language format, and wherein the input field converter converts the input fields in the markup language format to input fields in the text messaging format;

sending the static content of the stored information to the mobile device;

parsing and converting one or more elements of the dynamic content of the stored information from the markup language format into corresponding static content that is usable via the text messaging format from the mobile device, wherein the dynamic content includes a drop down menu interface with a first plurality of selections and a radio button user interface with a second plurality of selections, and wherein the first and the second plurality of selections are parsed and converted into a plurality of numbers in the text messaging format; and sending to the mobile device, the corresponding static content in a second text message that indicates how to interact with the website in the text messaging format, wherein:

the text messaging format is Short Message Service (SMS); and the markup language is Wireless Markup Language (WML) format, wherein the information is stored via a WML deck comprising a plurality of WML cards, wherein a first WML card is for input of login and password information via the browser, and wherein a second WML card is for providing a plurality of selectable options to the browser.

8. The system of claim 7, wherein the one or more elements of the dynamic content includes selections in a drop down menu interface and the corresponding static content is a list of numbers in the text messaging format; and wherein the second text message requests the mobile device to use the list of numbers in the text messaging format to interact with the website.

9. The system of claim 8, wherein one or more elements of the dynamic content further includes fields corresponding to login and password information; and wherein the computational device indicates to the mobile device in the text messaging format, a mechanism to separate the login and password information in the text messaging format for sending to the computational device.

10. The system of claim 7, wherein at least a processing power, a storage capacity and a bandwidth of the mobile device precludes a browser from being used in the mobile device to access the information stored in the markup language format.

11. The system of claim 10, wherein a first card is in the markup language format is for input of login and password information by the browser, and a second card in the markup language format is for providing options for choosing selections to a user who uses the browser.

12. The system of claim 11, wherein the interface application identifies input fields in the first and the second card and reformats the input fields of the first and the second card into the text messaging format, and wherein the input fields of the second card are mapped to letters of the alphabet in the text messaging format.

13. A computer program product, the computer program product comprising a computer readable storage medium having computer readable program code executed by a computational device to communicate with a mobile device and to perform operations, the operations comprising:
 receiving, by an interface application executing in the computational device, a first text message in a text messaging format from the mobile device to access a website that stores information in a markup language format, wherein the information includes both static content and dynamic content, wherein the mobile device is not configurable to support a browser that is configurable to interact with the website in the markup language format, wherein the interface application comprises a parser, an input field extractor, and an input field converter for the information stored in the markup language format, wherein the parser parses tokens stored in a markup language deck to generate a data structure of the tokens and relationships among the tokens, wherein the input field extractor determines which of the tokens are inputs fields in the markup language format, and wherein the input field converter converts the input fields in the markup language format to input fields in the text messaging format;
 sending, by the computational device, the static content of the stored information to the mobile device;
 parsing and converting, by the computational device, one or more elements of the dynamic content of the stored information from the markup language format into corresponding static content that is usable via the text messaging format from the mobile device, wherein the dynamic content includes a drop down menu interface with a first plurality of selections and a radio button user interface with a second plurality of selections, and wherein the first and the second plurality of selections are parsed and converted into a plurality of numbers in the text messaging format; and
 sending, by the computational device to the mobile device, the corresponding static content in a second text message that indicates how to interact with the website in the text messaging format, wherein:
 the text messaging format is Short Message Service (SMS); and
 the markup language is Wireless Markup Language (WML) format, wherein the information is stored via a WML deck comprising a plurality of WML cards, wherein a first WML card is for input of login and password information via the browser, and wherein a second WML card is for providing a plurality of selectable options to the browser.

14. The computer program product of claim 13,
 wherein the one or more elements of the dynamic content includes selections in a drop down menu interface and the corresponding static content is a list of numbers in the text messaging format; and
 wherein the second text message requests the mobile device to use the list of numbers in the text messaging format to interact with the website.

15. The computer program product of claim 14,
 wherein one or more elements of the dynamic content further includes fields corresponding to login and password information; and
 wherein the computational device indicates to the mobile device in the text messaging format, a mechanism to separate the login and password information in the text messaging format for sending to the computational device.

16. The computer program product of claim 13, wherein at least a processing power, a storage capacity and a bandwidth of the mobile device precludes a browser from being used in the mobile device to access the information stored in the markup language format.

17. The computer program product of claim 16, wherein a first card is in the markup language format is for input of login and password information by the browser, and a second card in the markup language format is for providing options for choosing selections to a user who uses the browser.

18. The computer program product of claim 17, wherein the interface application identifies input fields in the first and the second card and reformats the input fields of the first and the second card into the text messaging format, and wherein the input fields of the second card are mapped to letters of the alphabet in the text messaging format.

* * * * *